United States Patent
Matejka et al.

(10) Patent No.: US 10,761,956 B2
(45) Date of Patent: Sep. 1, 2020

(54) TECHNIQUES FOR VISUALIZING DYNAMIC DATASETS

(71) Applicant: AUTODESK, INC., San Rafael, CA (US)

(72) Inventors: Justin Frank Matejka, Newmarket (CA); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 1121 days.

(21) Appl. No.: 14/542,390

(22) Filed: Nov. 14, 2014

(65) Prior Publication Data

US 2015/0156076 A1    Jun. 4, 2015

Related U.S. Application Data

(60) Provisional application No. 61/911,301, filed on Dec. 3, 2013.

(51) Int. Cl.
*G06F 11/32* (2006.01)
*G06F 16/74* (2019.01)
*H04L 12/24* (2006.01)

(52) U.S. Cl.
CPC .......... *G06F 11/323* (2013.01); *G06F 16/743* (2019.01); *H04L 41/12* (2013.01); *H04L 41/14* (2013.01)

(58) Field of Classification Search
CPC ......... H04L 41/12; H04L 41/14; G06F 11/323
See application file for complete search history.

(56) References Cited

U.S. PATENT DOCUMENTS

| | | | |
|---|---|---|---|
| 2012/0198346 A1* | 8/2012 | Clemm | H04L 43/0817 715/736 |
| 2013/0232452 A1* | 9/2013 | Krajec | G06F 3/0482 715/840 |
| 2014/0019879 A1* | 1/2014 | Krajec | G06F 11/3082 715/753 |
| 2014/0156247 A1* | 6/2014 | Pradalier | G06F 19/26 703/11 |

(Continued)

OTHER PUBLICATIONS

Christakis et al., "The Spread of Obesity in a Large Social Network Over 32 Years"(Jul. 26, 2007), N Engl J Med 2007; 357: pp. 370-379 and supplementary material [retrieved from http://www.nejm.org/doi/full/10.1056/NEJMsa066082#t=article].*

(Continued)

*Primary Examiner* — Brian W Wathen
(74) *Attorney, Agent, or Firm* — Artegis Law Group, LLP

(57) ABSTRACT

A visualization engine is configured to generate a network visualization that represents the evolution of a network over time. The visualization engine generates the network visualization based on a network dataset that describes various nodes within the network, and links between those nodes, over a sequence of time intervals. Initially, the visualization engine generates a stable simulated network based on initial network data, and then subsequently animates changes to that simulated network that derive from differences between the initial network data and subsequent network data. The visualization engine visually indicates changes to different nodes in the network via color changes, size changes, and other changes to the appearance of nodes.

22 Claims, 16 Drawing Sheets

(56) References Cited

U.S. PATENT DOCUMENTS

| | | | | |
|---|---|---|---|---|
| 2014/0292765 A1* | 10/2014 | Maruyama | ............ | G06T 11/206 345/440 |
| 2015/0052441 A1* | 2/2015 | Degioanni | ............ | G06F 3/0481 715/734 |
| 2015/0089424 A1* | 3/2015 | Duffield | ................ | G06F 3/0484 715/771 |

OTHER PUBLICATIONS

Moody et al., "Dynamic Network Visualization" (Jan. 2005), American Journal of Sociology, vol. 110, No. 4, pp. 1-38 [retrieved from http://wiki.commres.org/pds/CommunicationTheory/DynamicNetworkVisualization.pdf].*

Wikipedia, "Flip Book" (Jun. 6, 2014), pp. 1-3 [retrieved from https://en.wikipedia.org/w/index.php?title=Flip_book&oldid=611827362].*

Collberg et al. "A System for Graph-Based Visualization of the Evolution of Software" (2003), ACM Symposium on Software Visualization, pp. 77-86, 212 [retrieved from https://dl.acm.org/citation.cfm?id=774844].*

Fruchterman et al., "Graph Drawing by Force-directed Placement" (Nov. 1991), Software-Practice and Experience, vol. 21(11), pp. 1123-1164 [retrieved from https://onlinelibrary.wiley.com/doi/abs/10.1002/spe.4380211102].*

Rufiange et al., "DiffAni: Visualizing Dynamic Graphs with a Hybrid of Difference Maps and Animation" IEEE Transactions on Visualization and Computer Graphics, vol. 19, No. 12 (Dec. 2013), pp. 2556-2565 [retrieved from https://ieeexplore.ieee.org/stamp/stamp.jsp?tp=&arnumber=6634116].*

Archambault et al., "Difference Map Readability for Dynamic Graphs" International Symposium on Graph Drawing (2011), pp. 50-61 [retrieved from https://rd.springer.com/chapter/10.1007/978-3-642-18469-7_5].*

Alexander, et al., "Revisiting Read Wear: Analysis, Design, and Evaluation of a Footprints Scrollbar", CHI Apr. 8, 2009, Desktop Techniques, pp. 1665-1674.

André, et al., "Discovery is Never by Chance: Designing for (Un)Serendipity", Creativity and Cognition, Oct. 26-30, 2009, 10 pages.

Aris, et al., "Visual Overviews for Discovering Key Papers and Influences Across Research Fronts", Journal of the American Society for Information Science and Technology, 60(11), 2009, pp. 2219-2228.

Bailer, et al., "Video Content Browsing Based on Iterative Feature Clustering for Rushes Exploration", TRECVID Workshop, May 2011, pp. 230-239.

Barnes, et al., "Video Tapestries with Continuous Temporal Zoom", ACM SIGGRAPH. Article 89, Jul. 2010, 9 pages.

Bederson, "Interfaces for Staying in the Flow", Ubiquity, Sep. 2004, 8 pages.

Bederson, et al., "Pad++: A Zooming Graphical Interface for Exploring Alternate Interface Physics", UIST, Jan. 1994, 10 pages.

Brandt, et al., "Example-Centric Programming: Integrating Web Search into the Development Environment", CHI 2010 End-User Programming I, Apr. 10-15, 2010, pp. 513-522.

Byrd, "A Scrollbar-based Visualization for Document Navigation", Proceedings of the Fourth ACM Conference on Digital Libraries, 1999, 8 pages.

Gao, et al., "FacetAtlas: Multifaceted Visualization for Rich Text Corpora", IEEE Transactions on Visualization and Computer Graphics, 16(6), 2010, pp. 1172-1181.

Card, et al., "The WebBook and the Web Forager: An Information Workspace for the World-Wide Web", Human factors in computing systems, 1996, 11 pages.

Divakaran, et al., "Augmenting Fast-Forward and Rewind for Personal Digital Video Recorders", IEEE ICCE, 2005, 5 pages.

Dunne, et al., "GraphTrail: Analyzing Large Multivariate, Heterogeneous Networks while Supporting Exploration History", CHI May 5-10, 2012, 10 pages.

Dunne, et al., "Rapid Understanding of Scientific Paper Collections: Integrating Statistics, Text Analytics, and Visualization", Computational Linguistics, 2011, 31 pages.

Giles, et al., "CiteSeer: An Automatic Citation Indexing System", Third ACM Conference on Digital Libraries, 1998, pp. 89-98.

Girgensohn, et al., "DocuBrowse: Faceted Searching, Browsing, and Recommendations in an Enterprise Context", Feb. 7-10, 2010, 10 pages.

Gove, et al., "Evaluating Visual and Statistical Exploration of Scientific Literature Networks", IEEE VLHCC, 2011, 8 pages.

Gray, et al., "Milliseconds Matter: An Introduction to Microstrategies and to Their Use in Describing and Predicting Interactive Behavior", Journal of Experimental Psych., 6(4), 2000, pp. 322-335.

Grossman, et al., "Chronicle: Capture, Exploration, and Playback of Document Workflow Histories", UIST, Oct. 3-6, 2010, pp. 143-152.

Hearst, "UIs for Faceted Navigation Recent Advances and Remaining Open Problems", Interfaces, 2008, 5 pages.

Hong, et al., "Turning Pages of 3D Electronic Books", IEEE Symposium on 3D User Interfaces, Mar. 25-26, 2006, pp. 159-165.

Howland, et al., "How Scholarly is Google Scholar? A Comparison to Library Databases", College & Research Libraries, 70(3), 2009, pp. 227-234.

Hürst, "Interactive Audio-Visual Video Browsing", ACM MM, Oct. 23-27, 2006, 4 pages.

Hürst, et al., "Quantity versus Quality—The Role of Layout and Interaction Complexity in Thumbnail-based Video Retrieval Interfaces", ICMR, Jun. 5-8, 2012, 8 pages.

Jackson, et al., "Panopticon: A Parallel Video Overview System", ACM UIST, Oct. 8-11, 2013, pp. 8.

Janin, et al., "Joke-o-mat HD: Browsing Sitcoms with Human Derived Transcripts", ACM Multimedia, 2010, 3 pages.

Jeng, "What is Usability in the Context of the Digital Library and How Can It Be Measured?" Information Technology and Libraries, 24(2), Jun. 2005, pp. 47-56.

Lee, et al., FacetLens: Exposing Trends and Relationships to Support Sensemaking within Faceted Datasets, CHI, Apr. 4-9, 2009, 10 pages.

Lee, et al., "Understanding Research Trends in Conferences using PaperLens", CHI Apr. 2-7, 2005, pp. 1969-1972.

Matejka, et al., "Citeology: Visualizing Paper Genealogy", CHI Extended Abstracts, May 5-10, 2012, 9 pages.

Matejka, et al., "Swift: Reducing the Effects of Latency in Online Video Scrubbing", ACM CHI, May 5-10, 2012, 10 pages.

Matejka, et al., "Swifter: Improved Online Video Scrubbing", ACM CHI, Apr. 27-May 2, 2013, pp. 1159-1168.

Nel, "Large Image Support in Digital Repositories", Master of Philosophy, Department of Computer Science, University of Cape Town, Jan. 2010, 92 pages.

Pietriga, "A Toolkit for Addressing HCI issues in Visual Language Environments", VLHCC Oct. 2005, 9 pages.

Pirolli, "Information Foraging in Information Access Environments", Creativity, Jan. 1995, 10 pages.

Plaisant, "The Challenge of Information Visualization Evaluation", AVI, 11(4), 2004, 8 pages.

Pongnumkul, "Content-Aware Dynamic Timeline for Video Browsing", ACM UIST, Oct. 3-6, 2010, pp. 139-142.

Ramos, et al., "Fluid Interaction Techniques for the Control and Annotation of Digital Video", ACM UIST, 2003, pp. 105-114.

Rooke, et al., "AppMap: Exploring User Interface Visualizations", Graphics Interface 2011, pp. 111-118.

Schoeffmann, et al., "The Video Explorer—A Tool for Navigation and Searching within a Single Video based on Fast Content Analysis", ACM SIGMM, Feb. 22-23, 2010, 12 pages.

Strobelt, et al., "Document Cards: A Top Trumps Visualization for Documents", InfoVis, Jul. 27, 2009, 8 pages.

Teevan, et al., "Visual Snippets: Summarizing Web Pages for Search and Revisitation", CHI, 2009, 11 pages.

(56) References Cited

OTHER PUBLICATIONS

Truong, et al., "Video Abstraction: A Systematic Review and Classification" ACM Transactions on Multimedia Computing Communications and Applications, vol. 3, No. 1, Article 3, Feb. 2007, 37 pages.
Tse, et al., "Dynamic Key Frame Presentation Techniques for Augmenting Video Browsing", ACM AVI, 1998, pp. 185-194.
Wexelblat, et al., "Footprints: History-Rich Tools for Information Foraging", CHI, 1999, 8 pages.
Woodruff, et al., "Using Thumbnails to Search the Web", SIGCHI Mar. 31-Apr. 4, 2001, 8 pages.

* cited by examiner

TECHNIQUES FOR VISUALIZING DYNAMIC DATASETS

CROSS-REFERENCE TO RELATED APPLICATIONS

This application claims the benefit of United States provisional patent application titled "Techniques for Viewing and Searching Different Types of Content," filed on Dec. 3, 2013 and having Ser. No. 61/911,301. The subject matter of this related application is hereby incorporated herein by reference.

BACKGROUND OF THE INVENTION

Field of the Invention

The present invention relates generally to computer science and, more specifically, to techniques for visualizing dynamic datasets.

Description of the Related Art

Networks are a pervasive concept in everyday life. A network generally includes a collection of nodes that are connected by a set of links between those nodes. On a daily basis, people both use networks and participate in networks. For example, many people use the World Wide Web on a daily basis. As is well known, the World Wide Web is a collection of documents that are linked together by hyperlinks. In this context, the documents of the World Wide Web could represent nodes, while the hyperlinks could represent links between those nodes. In another example, many people work for large corporations that embody a particular management hierarchy, thereby participating in a network with a particular structure reflective of that hierarchy. In this context, employees within the hierarchy could correspond to nodes, while managerial relationships could correspond to links between those employees.

Understanding the structure of networks is a relevant task given the degree to which people are exposed to networks on a daily basis. However, few tools exist for assisting people with this task. Conventional approaches simply display a very large image that includes numerous nodes along with a tangled web of links between those nodes. Given the sheer complexity of a typical network, such approaches are often intractable and may cause more confusion than insight.

As the foregoing illustrates, what is needed in the art is a more effective approach to visualizing a network.

SUMMARY OF THE INVENTION

One embodiment of the present invention sets forth a computer-implemented method for visualizing a network described by a sequence of network data, including generating a simulated network based on first network data included in the sequence of network data, where the first network data identifies a first set of nodes and a first set of links associated with the first set of nodes, rendering a first image that illustrates the first set of nodes and the first set of links, modifying the simulated network based on second network data in the sequence of network data to generate a modified simulated network, where the second network data identifies a second set of nodes and a second set of links associated with the second set of nodes, rendering a second image that illustrates the second set of nodes and the second set of links, and generating a visualization of the network for display based on the first image and the second image to animate the evolution of the network over time.

At least one advantage of the present invention is that the organizational structure of a complex network, and changes to that network, can be visualized over time.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1A:
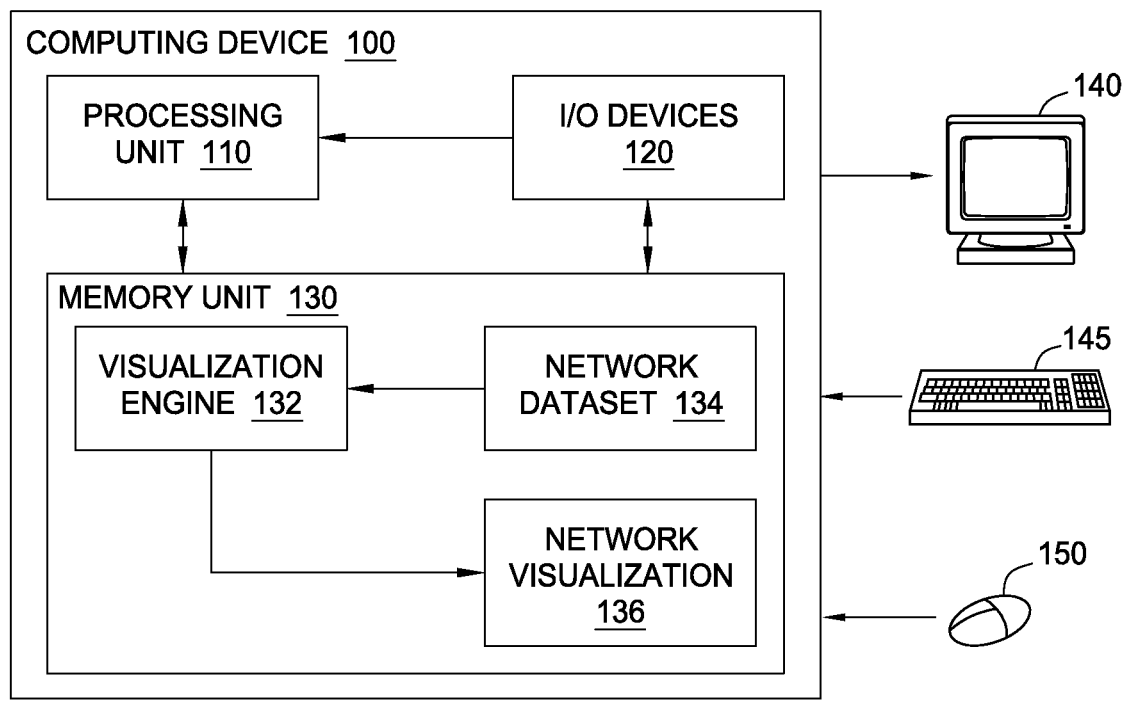
FIG. 1A illustrates a computing device configured to implement one or more aspects of the present invention.

FIG. 1A illustrates a computing device configured to implement one or more aspects of the present invention. As shown, computing device 100 includes a processing unit 110, input/output (I/O) devices 120, and a memory unit 130 coupled together. Memory unit 130 includes a visualization engine 132, a network dataset 134, and a network visualization 136. Computing device 100 is coupled to a display device 140, a keyboard 145, and a mouse 150. Display device 140 is configured to display network visualization 136 to the end-user. Keyboard 145 and mouse 150 are configured to receive input from the end-user. In one embodiment, a touch screen may implement the functionality of display device 140, keyboard 145, and mouse 150.

Processing unit 110 may be any technically feasible unit configured to process data and execute software applications, including a central processing unit (CPU), a graphics processing unit (GPU), a CPU coupled to a GPU, and so forth. I/O devices 120 may include any technically feasible device configured to receive input, generate output, or both receive and generate output. For example, I/O devices could include keyboard 145, mouse 150, or other devices configured to receive input, display device 140, a speaker, or other devices configured to generate output, or a touchscreen, a universal serial bus (USB) port, or other devices configured to both receive and generate output. Memory unit 130 may be any technically feasible data storage device or collection of such devices, including a hard disk, a random access memory (RAM) module, a flash drive, and so forth.

Visualization engine 132 is a software application that, when executed by processing unit 110, reads network dataset 134 and then generates network visualization 136 based on that dataset for display via display device 150. Network dataset 134 includes time-varying data that describes the evolution of a network over time. For example, network dataset 134 could describe the evolution of a company, a social group, the World Wide Web, or any other type of dynamic network that changes over time.

More specifically, network dataset 134 includes slices of network data, where each sequential slice of network data reflects the state of the associated network at a different point in time. The different points in time are generally separated by a particular time interval, such as, e.g., days, months, years, and so forth. For a given point in time, network dataset 134 includes network data that, in turn, includes a set of nodes associated with the network at the given point in time and a set of links between those nodes at that point in time.

For example, in the context of a company network, the nodes could represent employees of the company at a given point in time, while the links could represent the management structure of the company at that point in time. In the context of a social network, the nodes could represent people at a given point in time, while the links could represent different types of relationships the people may have (e.g., friends, roommates, relatives, etc.) at that point in time. In the context of the World Wide Web, the nodes could represent webpages at a given point in time, while the links could represent hyperlinks between those webpages at that point in time. Persons skilled in the art will understand that network dataset 134 may describe the time-varying evolution of any type of network over any time period and with any size time interval.

Figure 1B:
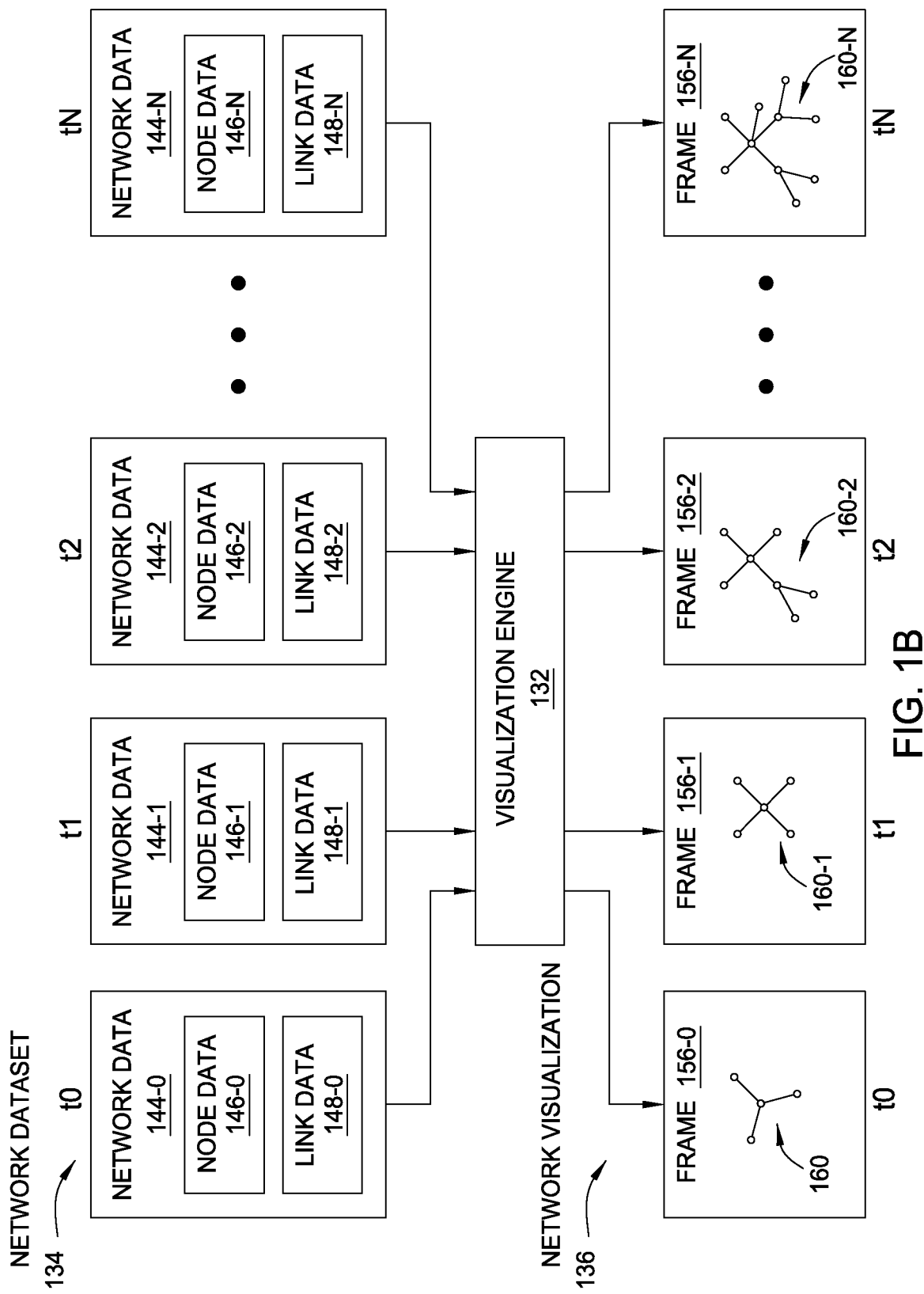
FIG. 1B illustrates data that is processed by the computing device of FIG. 1A to generate a visualization of a simulated network, according to one embodiment of the present invention.

Visualization engine 132 generates network visualization 136 to illustrate the nodes and links specified by network dataset 134 over time, and then displays that network visualization 136 to an end-user via display device 140. In doing so, visualization engine 132 generates a sequence of frames, where each frame illustrates the network associated with network dataset 132 at a different point in time. Visualization engine 132 then combines those frames into an animation for display to the end-user. FIG. 1B illustrates the aforementioned process in greater detail.

FIG. 1B illustrates data that is processed by computing device 100 of FIG. 1B to generate network visualization 136, according to one embodiment of the present invention. As shown, network dataset 134 includes network data 144-0, 144-1, and 144-2 through 144-N. Each network data 144 includes a set of nodes and a set of links between those nodes. Specifically, network data 144-0 includes node data 146-0 and link data 148-0, network data 144-1 includes node data 146-1 and link data 148-1, network data 144-2 includes node data 146-2 and link data 148-2, and network data 144-N includes node data 146-N and link data 148-N. Node data 146 and link data 148 within each network data 144 describe the state of a network at a different point in time. In particular, node data 146-0 and link data 148-0 describe the state of the network at time t0, node data 146-1 and link data 148-1 describe the state of the network at time t1, node data 146-2 and link data 148-2 describe the state of the network at time t2, and node data 146-0 and link data 148-N describe the state of the network at time tN. As such, network dataset 134 as a whole reflects the evolution of that network over the period of time defined by t1–tN.

As also shown, visualization engine 132 is configured to process each network data 144 to generate a sequence of frames 156 that include a simulated network 160. Simulated network 160 is a graphical depiction of the network described by network data 144. Each frame 156 simulates the state of that network at a different point in time associated with network data 144. In particular, frame 156-0 illustrates the state of simulated network 160 at time t0, as described by network data 144-0, frame 156-1 illustrates the state of simulated network 160 at time t1, as described by network data 144-1, frame 156-2 illustrates the state of simulated network 160 at time t2, as described by network data 144-2, and frame 156-N illustrates the state of simulated network 160 at time tN, as described by network data 144-N. Visualization engine 132 is configured generate network visualization 136 by combining frames 156 into an animation, and to then display that animation to the end-user.

Referring generally to FIGS. 1A-1B, visualization engine 132 is configured to generate network visualization 136 by (i) performing an initialization process for simulated network 160 based on initial network data 144 (such as e.g., network data 144-0), and then (ii) generating sequentially changing frames of network visualization 136 that illustrate simulated network 160 based on subsequent network data 144 (such as, e.g., network data 144-1 through 144-N). The initialization process mentioned above is described in greater detail below in conjunction with FIGS. 2A-3, while various techniques for generating additional sequential frames of network visualization 136 are described in greater detail below in conjunction with FIGS. 4A-7.

Initializing a Simulated Network

Figure 2A:
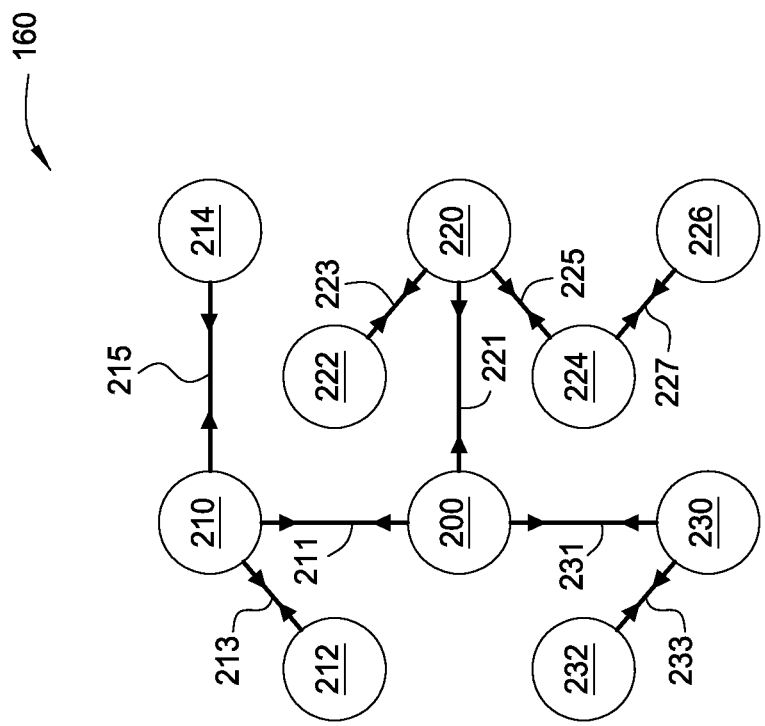
FIGS. 2A-2C illustrate the simulated network of FIG. 1B during a sequence of initialization stages, according to one embodiment of the present invention.
Figure 2B:
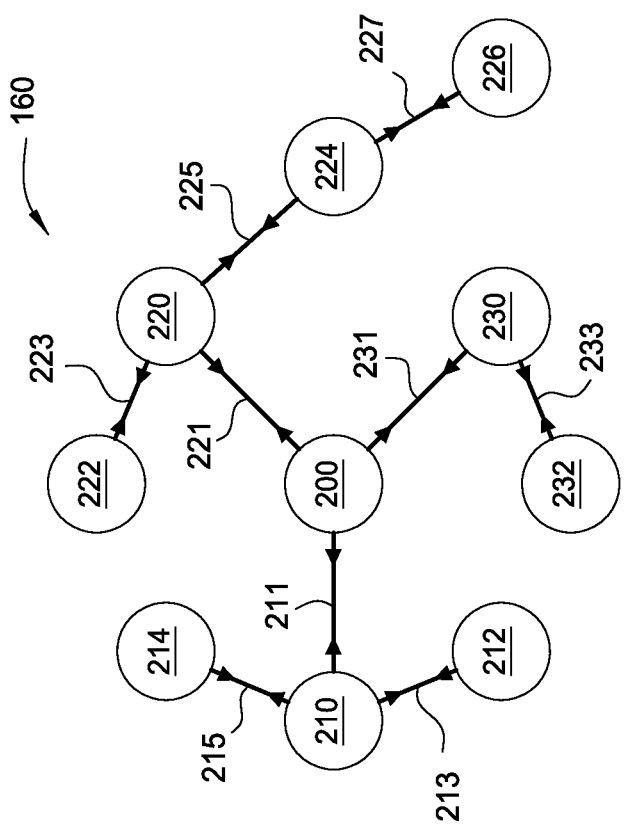
Figure 2C:
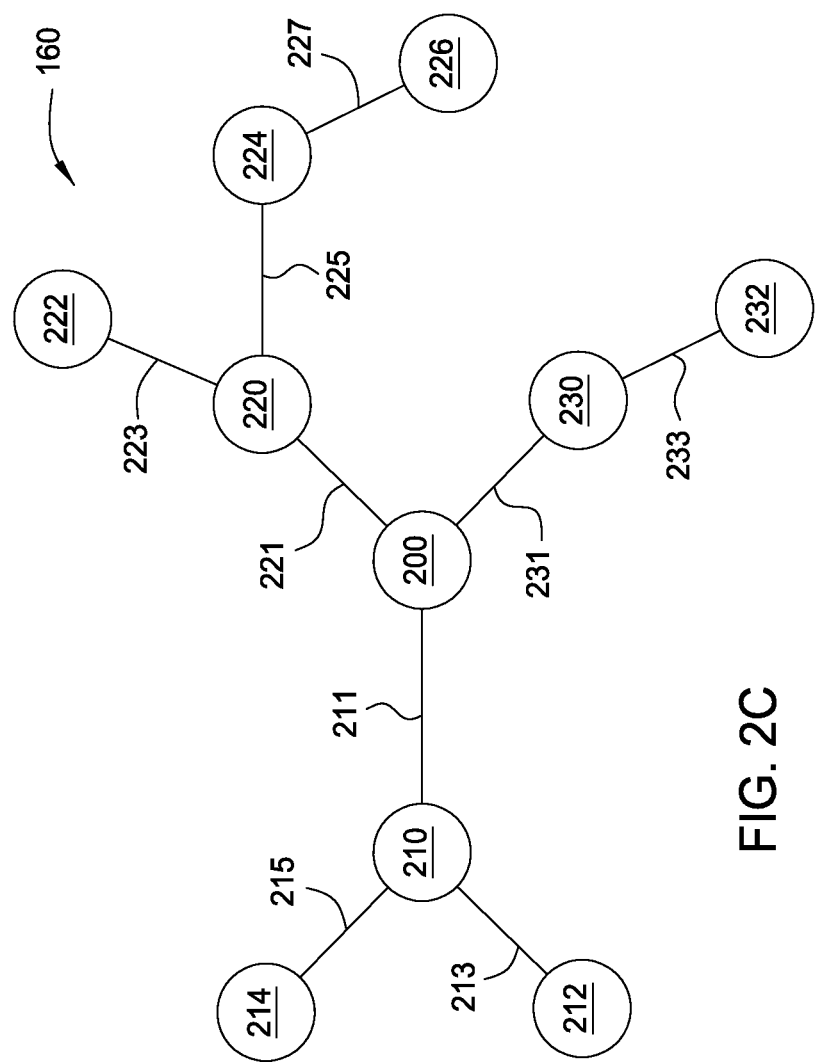

FIGS. 2A-2C illustrate simulated network 160 of FIG. 1B during a sequence of initialization stages, according to one embodiment of the present invention. Prior to generating sequential frames 156 of network visualization 136, visualization engine 132 performs an internal initialization process (mentioned above) that involves arbitrarily placing nodes associated with simulated network 160 into a multidimensional coordinate system associated with a physical simulation. Then, visualization engine 132 iteratively applies a set of physical laws of motion to those nodes until simulated network 160 as a whole reaches physical equilibrium within that simulation. The set of physical laws of motion mentioned above could reflect, for example, Newton's Laws of Motion or some derivative thereof. Generally, these laws can be summarized as follows: (i) each node repels each other node, and (ii) each link between two nodes attracts the two linked nodes to one another.

According to these laws, each node associated with simulated network 160 may be subject to a collection of repulsive forces as well as one or more of attractive forces. As a general matter, any force exerted between nodes, including both repulsive and attractive forces, may be a function of distance between those nodes. During the initialization process, visualization engine 132 sums both the repulsive and the attractive forces exerted on each node, and then updates the position of each such node based on the sum of those forces, as illustrated by the sequence of initialization stages associated with FIGS. 2A-2C.

As shown in FIG. 2A, simulated network 160 includes nodes 200, 210, 212, 220, 222, 224, 226, 230, and 232 and links 211, 213, 215, 221, 223, 225, 227, 231, and 233. Node 200 is coupled to nodes 210, 220, 230 by links 211, 221, and 231, respectively. Node 210 is coupled to nodes 212 and 214 by links 213 and 215, respectively. Node 220 is coupled to nodes 222, and 224 by links 223 and 225, respectively. Node 224 is coupled to node 226 by link 227. Node 230 is coupled to node 232 by link 233. The various nodes and links included in simulated network 160 represent visualizations of node data 146-0 and link data 148-0 associated with network data 144-0. Again, visualization engine 132 initializes simulated network 160 based on initial network data 144-0 in the sequence of network data 144.

FIG. 2B illustrates simulated network 160 after one or more iterations of the initialization process, meaning that visualization engine 132 has applied the set of physical laws mentioned above one or more times. As is shown, the various nodes are dispersed relative to the positions of those nodes shown in FIG. 2A. However, nodes that are linked together remain within proximity of one another due to the attractive force between those linked nodes. The proximity between a given pair of nodes in simulated network 160 may reflect a balance between the repulsive and attractive forces exerted between those nodes.

FIG. 2C illustrates simulated network 160 after the initialization process is complete. Visualization engine 132 may determine that the initialization process is complete when application of the set of physical laws does not cause significant changes in position for the nodes within simulated network 160 and/or when the total force exerted on each node falls below a threshold value. In other words, visualization engine 132 determines that initialization is complete when simulated network 160 stabilizes. As is shown, simulated network 160 has unfolded significantly compared to that shown in FIG. 2A.

Referring generally to FIGS. 2A-2C, visualization engine 132 may rely on any technically feasible technique for simulating motion of nodes within simulated network 160. In doing so, visualization engine 132 may rely on various physical and/or simulation parameters. For example, visualization engine 132 may assign a mass to each node in order to compute the acceleration of each such node, assign a specific repulsive force generated by each node or assign a specific attractive force associated with each link, determine an appropriate time step for computing position changes during initialization, determine appropriate grid spacing for the multidimensional coordinate system, and so forth. The initialization process discussed above is also described, in stepwise fashion, below in conjunction with FIG. 3.

Figure 3:
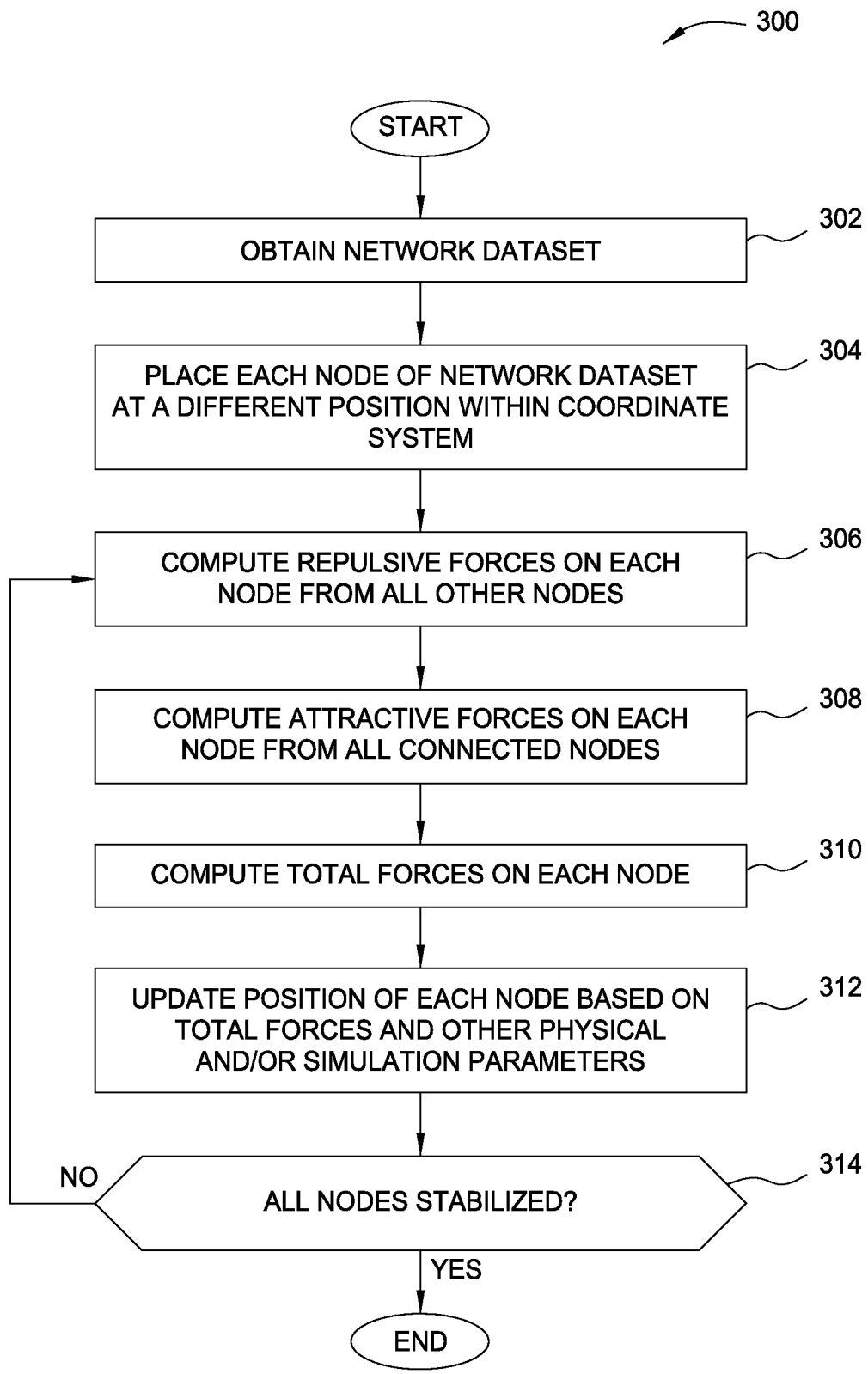
FIG. 3 is a flow diagram of method steps for initializing a simulated network based on a network dataset, according to one embodiment of the present invention.

FIG. 3 is a flow diagram of method steps for initializing a network visualization based on a network dataset, according to one embodiment of the present invention. Although the method steps are described in conjunction with the system of FIGS. 1-2C, persons skilled in the art will understand that any system configured to perform the method steps, in any order, is within the scope of the present invention.

As shown, a method 300 begins at step 302, where visualization engine 132 obtains network dataset 134. Network dataset 134 includes slices of network data, where each slice of network data reflects the state of the associated network at a different point in time, as shown in FIG. 1B.

At step 304, visualization engine 132 places each node of network dataset 134 at a different position within a multidimensional coordinate system associated with a physical simulation. In doing so, visualization engine 132 generates simulated network 160 within that simulation.

At step 306, visualization engine 132 computes repulsive forces on each node from all other nodes within simulated network 160. As mentioned above, each node within simulated network 160 generates a force that repels all other nodes, wherein that force may be a function of distance between nodes. Each node may generate the same repulsive force, or the different nodes may generate different repulsive forces based on various factors. For example, the repulsive force generated by a given node could depend on the number of connections associated with that node, among other possibilities.

At step 308, visualization engine 132 computes attractive forces on each node from all connected nodes. As mentioned above, each link within simulated network 160 generates a force that attracts the pair of nodes connected by that link to towards one another, where that force may be a function of distance between nodes. Each link may generate the same attractive force, or the different links may generate different attractive forces based on various factors. For example, the attractive force generated by a given link could depend on various properties associated with the connected nodes, among other possibilities.

At step 310, visualization engine 132 computes the total forces on each node within simulated network 160. In doing so, visualization engine 132 accumulates the repulsive forces exerted on each node, accumulates the attractive forces exerted on each node, and then sums these accumulated forces.

At step 312, visualization engine 132 updates the position of each node within simulated network 160 based on the total forces exerted on those nodes computed at step 310, as well as various other physical and/or simulation parameters. Physical parameters may include mass values associated with each node, among other possibilities, while simulation parameters may include a time step associated with the physical simulation or grid spacing values associated with the multidimensional coordinate system, among other possibilities. The method 300 then ends.

By implementing the initialization steps of the method 300, visualization engine 132 is configured to generate simulated network 160 and to stabilize that network. Once simulated network 160 is stable, visualization engine 132 may add nodes to that network, remove nodes, add clusters of nodes, adjust links, and perform other alterations to the structure of simulated network 160, based on subsequent network data 144. FIGS. 4A-7, described in greater detail below, illustrate various operations that may be performed to modify simulated network 160, as well as different techniques for visualizing that network.

Visualizing a Simulated Network

Figure 4A:
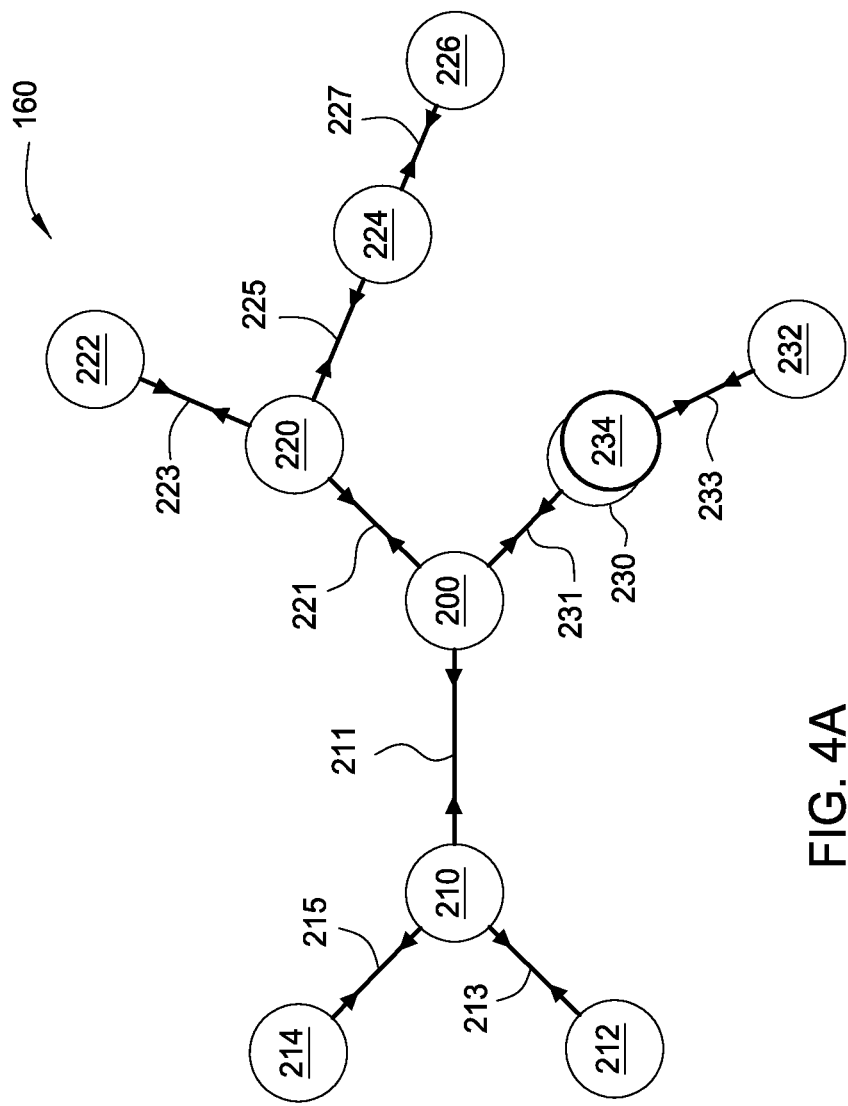
FIGS. 4A-4C illustrate a node added to the simulated network of FIG. 2C, according to one embodiment of the present invention.
Figure 4B:
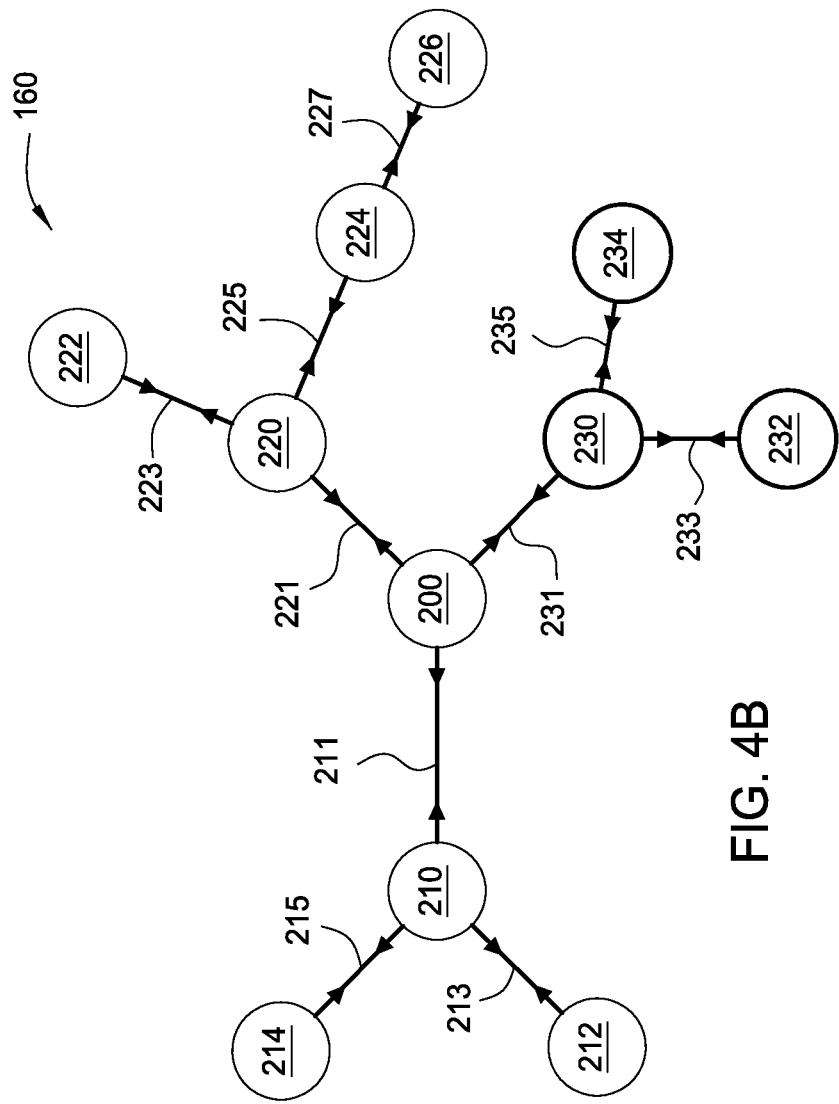
Figure 4C:
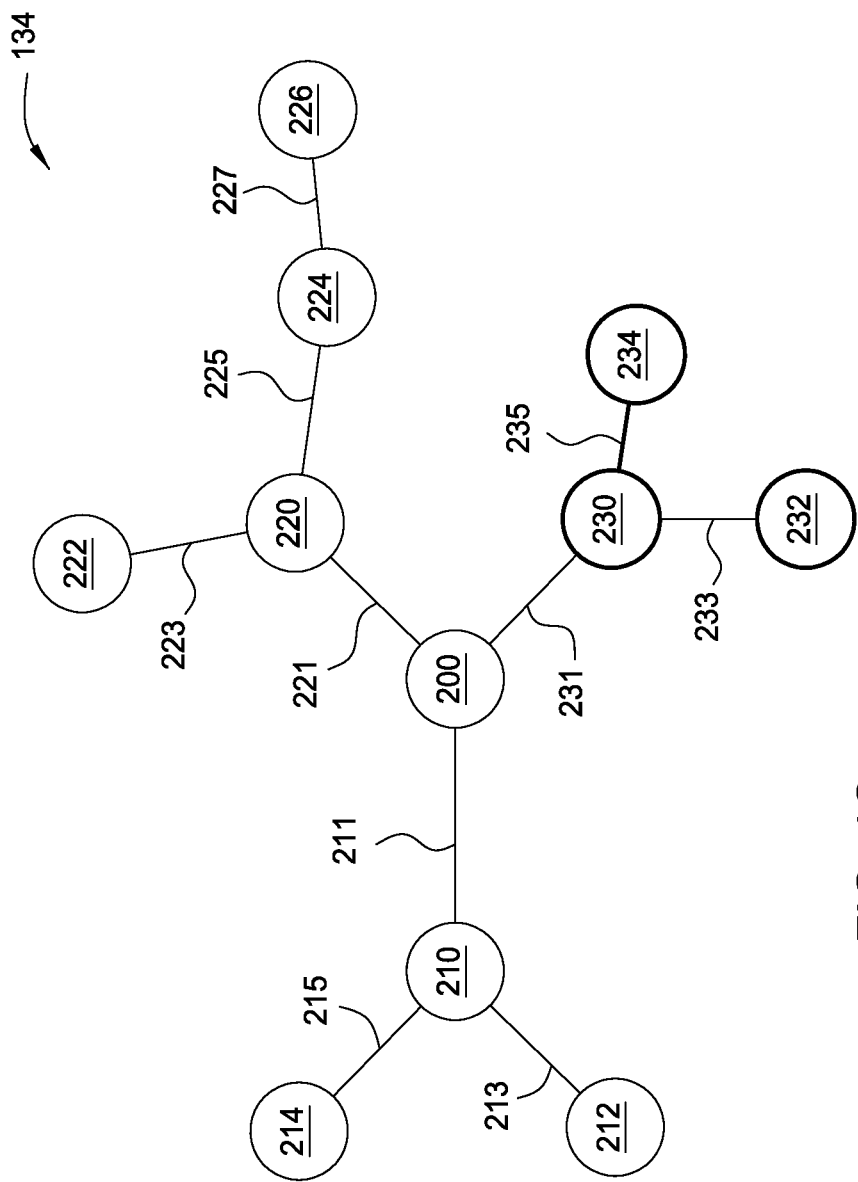

FIGS. 4A-4C illustrate a node added to the simulated network of FIG. 2C, according to one embodiment of the present invention. As shown in FIG. 4A, simulated network 160 has already undergone the initialization process based on network data 144-0, as described above in conjunction with FIGS. 2A-3. In addition, simulated network 160 now includes node 234. Node 234 may be included within, for example, node data 146-1 of network data 144-1. Node 234 could thus reflect a change to the network that simulated network 160 represents, where that change occurs at time t1 associated with network data 144-1. For example, if simulated network 160 represents a company hierarchy, then node 234 could represent an employee that was hired at time t1.

Visualization engine 132 is configured to place node 234 within simulated network 160 proximate to a parent node of node 234. In the exemplary configuration shown in FIG. 4A, node 230 is that parent node of node 234. In simulated network where nodes may have multiple parents, visualization engine 132 may place added nodes proximate to a selected parent or between parent nodes. Once node 234 is added, visualization engine 132 may then apply the set of physical laws discussed above in conjunction with FIGS. 2A-3. Specifically, visualization engine 132 recomputes the repulsive and attractive forces exerted on each node, and then updates the positions of those nodes accordingly. Although simulated network 160 is stable after the initialization process discussed above is complete, the addition of node 234 may destabilize that network and merit further position changes to the nodes within that network.

In one embodiment, visualization engine 132 is configured to visually indicate nodes that are added in the fashion shown in FIG. 4A, and may also visually indicate nodes that are destabilized by such additions. For example, visualization engine 132 could set the color of node 234 to a different color value than that associated with other nodes in simulated network 160, thereby indicating that node 234 is newly added to that network. Further, visualization engine 132 could set the color of links associated with newly added nodes, to differ from other pre-existing links. Visualization engine 132 may employ a wide variety of different techniques for visually indicating new nodes, beyond changing the color of those nodes. With this approach, visualization engine 132 may draw the attention of the end-user to changes to simulated network 160.

In FIG. 4B, visualization engine 132 adjusts the position of node 234 relative to nodes 230 and 232 so that node 234 disperses away from those nodes. In general, node 234 is subject to repulsive forces from all nodes within simulated network 160, however, since node 234 is closest to nodes 230 and 232, the repulsive forces exerted by those nodes on node 234 may be strongest compared to the other repulsive forces generated by other nodes. As such, visualization engine 132 adjusts the position of node 234 primarily relative to nodes 230 and 234. Visualization engine 132 may also adjust the positions of other nodes within simulated network 160 to account for the addition of node 234.

In FIG. 4C, visualization engine 132 adjusts the position of node 226 relative to node 134 so that node 226 disperses away from node 234. Visualization engine 132 may also adjust the positions of some or all of the other nodes within simulated network 160 in order to account for node 234. Generally, the adjustments performed by visualization engine 132 may stabilize simulated network 160 or increase the stability of simulated network 160.

In embodiments where visualization engine 132 visually indicates changes occurring within simulated network 160, visualization engine 132 may vary the color value of node 226 based on the degree to which visualization engine 132 adjusts the position of that node. With this approach, visualization engine 132 may draw the attention of the end-user to pre-existing regions of simulated network 160 that are affected by the addition of nodes. Visualization engine 132 may apply a similar technique when a node or nodes are removed form simulated network 160. For example, if visualization engine 132 removed node 234 (i.e., due to a change in network data 144 across a time interval), then visualization engine 132 may, in response, readjust the position of node 226 and, simultaneously, adjust the color of node 226 based on that position readjustment. In further embodiments, visualization engine 132 may visually indicate changes to simulated network 160 in proportion to those changes. For example, visualization engine 132 may vary the color of a node subject to a specific position adjustment in proportion to the position change effected by that adjustment.

Referring generally to FIGS. 4A-4C, when visualization engine 132 adds a node to simulated network 160 after the initialization process is complete, visualization engine 132 may generate a set of frames for network visualization 134 that reflect simulated network 160 as visualization engine 132 adjusts the positions of nodes within that network. For example, visualization engine 132 could generate three different frames of network visualization 134 that correspond to the three instances of simulated network 160 shown in FIGS. 4A, 4B, and 4C, respectively. With this approach, visualization engine 132 displays the evolution of simulated network 160 via a smoothly varying animation. The techniques described thus far are also applicable when nodes are deleted from simulated network 160. Visualization engine 132 may also add subnetworks of nodes to simulated network 160, as described in greater detail below in conjunction with FIGS. 5A-5C.

Figure 5A:
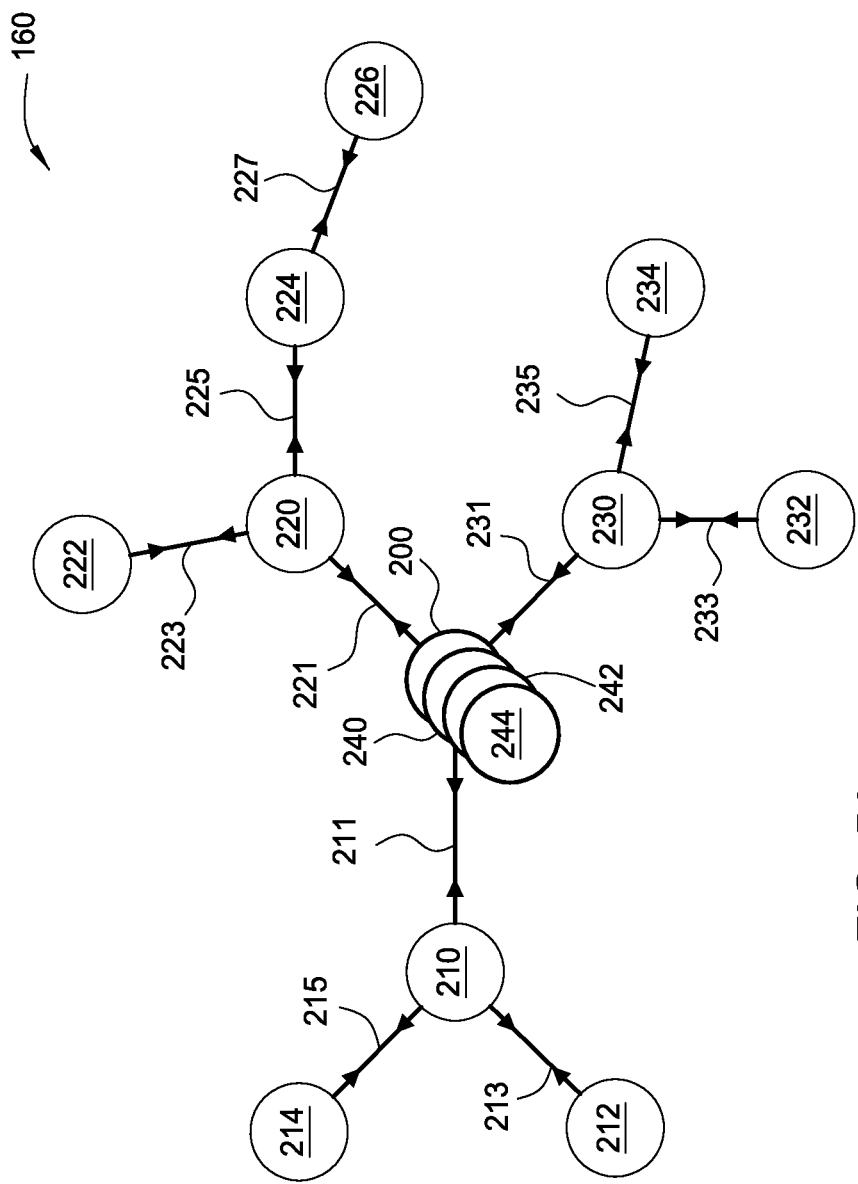
FIGS. 5A-5C illustrate a subnetwork of nodes added to the simulated network of FIG. 4C, according to one embodiment of the present invention.
Figure 5B:
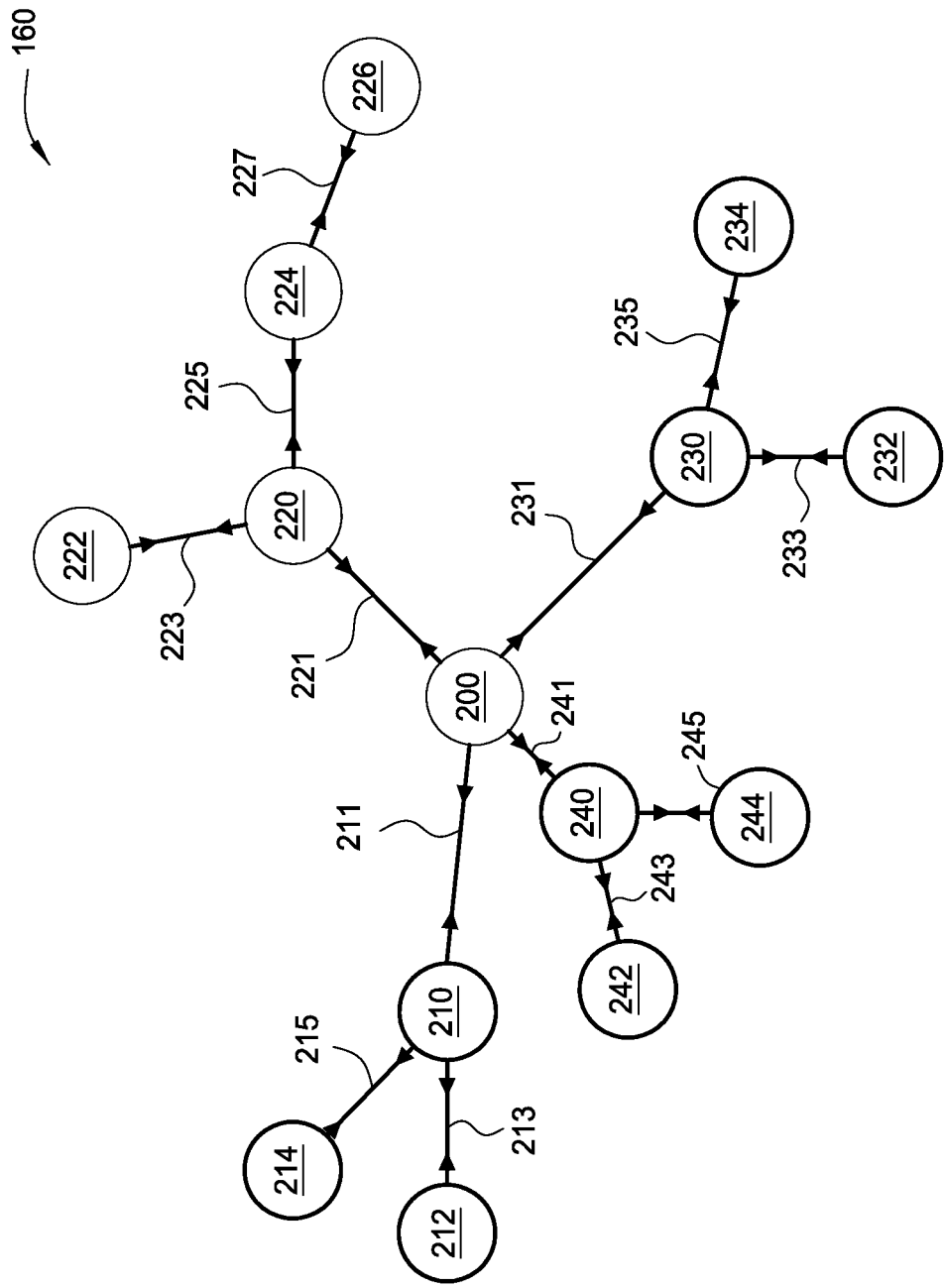
Figure 5C:
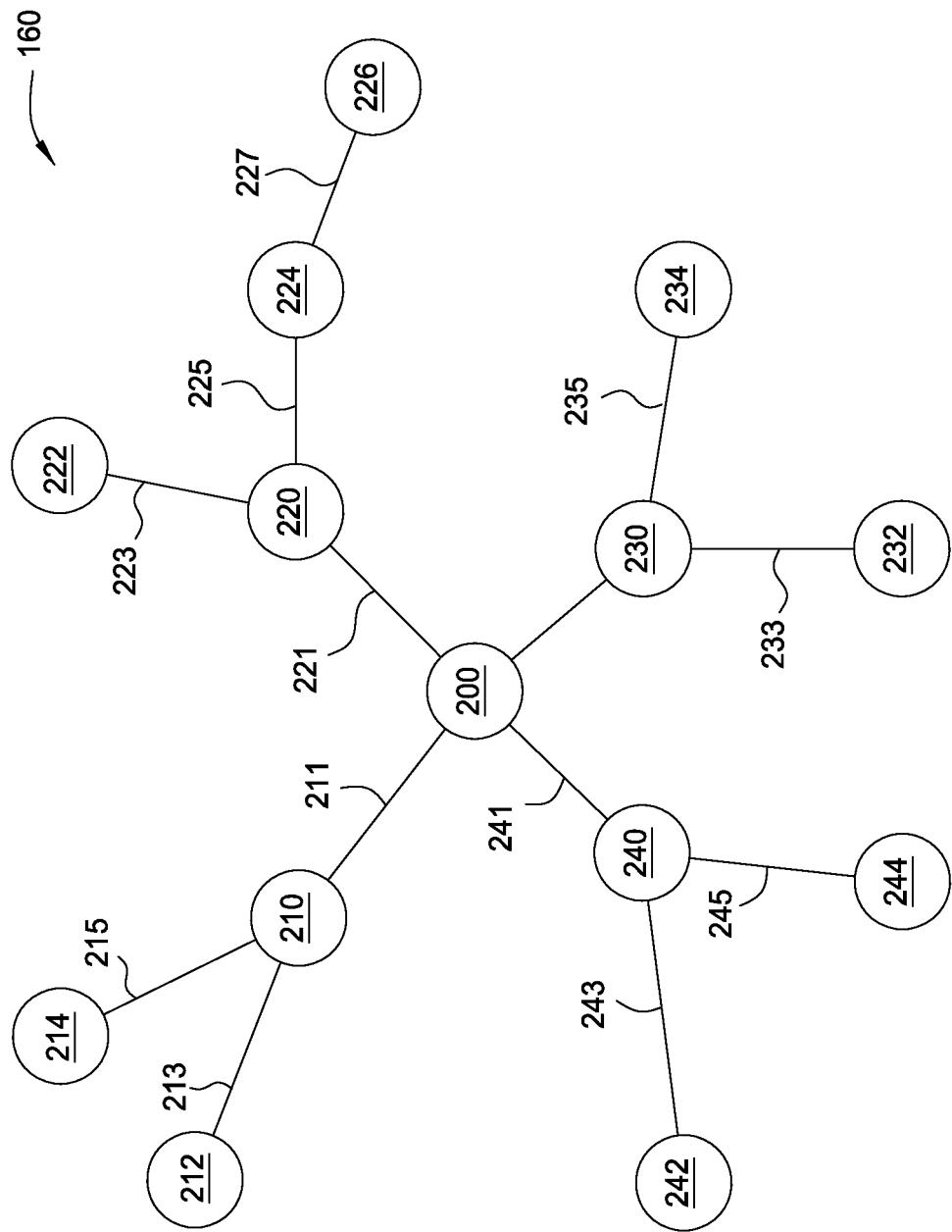

FIGS. 5A-5C illustrate a subnetwork of nodes added to simulated network 160 of FIG. 4C, according to one embodiment of the present invention. As shown in FIG. 5A, simulated network 160 includes previously added node 234, as described above in conjunction with FIGS. 4A-4C. In addition, simulated network 160 now includes nodes 240, 242, and 244. Nodes 240, 242, and 244 may be included within, for example, node data 146-N of network data 144-N. Nodes 240, 242, and 242 could thus reflect a change to the network that simulated network 160 represents, where that change occurs at time tN associated with network data 144-N. For example, if simulated network 160 represents a company hierarchy, then nodes 240, 242, and 244 could represent a company that was acquired at time tN.

Nodes 242 and 244 are child nodes of node 240, which, in turn, is a child node of node 200. As such, visualization engine 132 is configured to place node 240 proximate to node 200 (the parent node of node 240), and to place nodes 242 and 244 proximate to node 240 (the parent node of those nodes). Visualization engine 132 is configured to visually indicate these added nodes, in like fashion as described above in conjunction with FIG. 4A. Once these new nodes are added, visualization engine 132 may then apply the set of physical laws discussed above in conjunction with FIGS. 2A-4C. Specifically, visualization engine 132 recomputes the repulsive and attractive forces exerted on each node, and then updates the positions of those nodes accordingly, as shown in FIGS. 5B-5C.

In FIG. 5B, visualization engine 132 adjusts the position of nodes 240, 242, and 244 relative to node 230 so that the newly-added nodes disperse away from the other nodes in simulated network 160. In general, nodes 240, 242, and 244 are subject to repulsive forces from all nodes within simulated network 160, however, since those new nodes are closest to node 200, the repulsive forces exerted by that node on nodes 240, 242, and 244 may be strongest compared to the other repulsive forces generated by other nodes. As such, visualization engine 132 adjusts the position of nodes 240, 242, and 244 primarily relative to node 200 in the fashion shown. Visualization engine 132 may also adjust the positions of other nodes within simulated network 160 to account for the addition of nodes 240, 242, and 244.

In FIG. 5C, visualization engine 132 adjusts the position of nodes 210, 212, and 214 relative to nodes 240, 242, and 244 so that nodes 210, 212, and 214 disperse away from the newly-added nodes. Visualization engine 132 may also adjust the positions of some or all of the other nodes within simulated network 160 in order to account for those new nodes, as mentioned above. Generally, the adjustments performed by visualization engine 132 may stabilize simulated network 160 or increase the stability of simulated network 160. In like fashion as described above in conjunction with FIG. 4C, visualization engine 132 is configured to visually indicate nodes affected by the addition of new nodes. For example, in FIG. 5C, visualization engine 132 may modify the color of nodes 210, 212, and 214 to reflect the degree to which those nodes disperse away from nodes 240, 242, and 244.

Referring generally to FIGS. 5A-5C, when visualization engine 132 adds a collection of nodes to simulated network 160, visualization engine 132 may generate a set of frames for network visualization 134 that reflect simulated network 160 as visualization engine 132 adjusts the positions of nodes within that network. For example, visualization engine 132 could generate three different frames of network visualization 134 that correspond to the three instances of simulated network 160 shown in FIGS. 5A, 5B, and 5C, respectively. With this approach, visualization engine 132 displays the evolution of simulated network 160 when multiple nodes are added via a smoothly varying animation. The techniques described thus far are also applicable when collections of nodes are deleted from simulated network 160

Referring generally to FIGS. 4A-5C, the addition or deletion of nodes or collections of nodes, as described in conjunction with those Figures, generally occurs due to changes in network data 144 across different points in time. For example, should a node or collection of nodes be added or deleted from node data 146 between time t1 and time t2, visualization engine 132 may add or remove the node or collection of nodes from simulated network 160, thereby illustrating that network change to the end-user.

Between any two points in time, such as time t0 and t1 or tN−1 and tN, visualization engine 132 may iteratively apply the set of physical laws one or more times. However, in practice, once simulated network 160 is stabilized (i.e., via the techniques described in conjunction with FIGS. 2A-3), visualization engine 132 need only apply the set of physical laws once between points in time. As a result, each frame 156 of network visualization 136 that is created by visualization engine 132 illustrates nodes that move, if at all, by relatively small distances. This approach potentially maintains a certain degree of smoothness within network visualization 136, since nodes may not appear to jump from one location to another by a large distance. An alternative approach would be to iterate the application of the physical laws repeatedly between points in time, until simulated network 160 became stable. However, such an approach may result in a jumpy animation of the evolution of simulated network 160, and typically may not implemented.

Visualization engine 132 may graphically depict simulated network 160 with a variety of different visualization techniques, beyond those described above in conjunction with FIGS. 4A-5C. Some of those techniques are described, by way of example, below in conjunction with FIGS. 6A-6C.

Figure 6A:
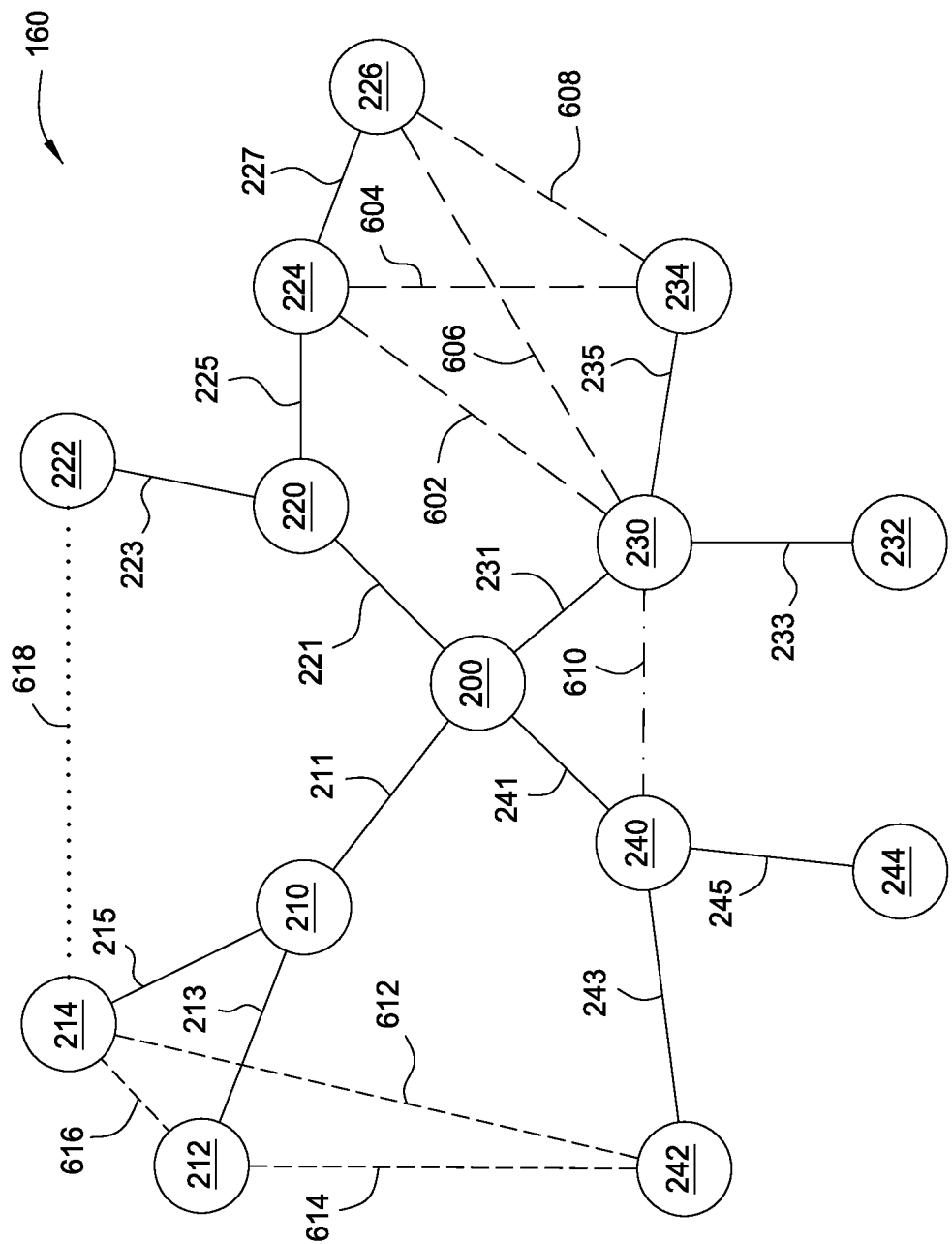
FIGS. 6A-6C illustrate different techniques for visualizing the simulated network of FIG. 5C, according to various embodiment of the present invention.
Figure 6B:
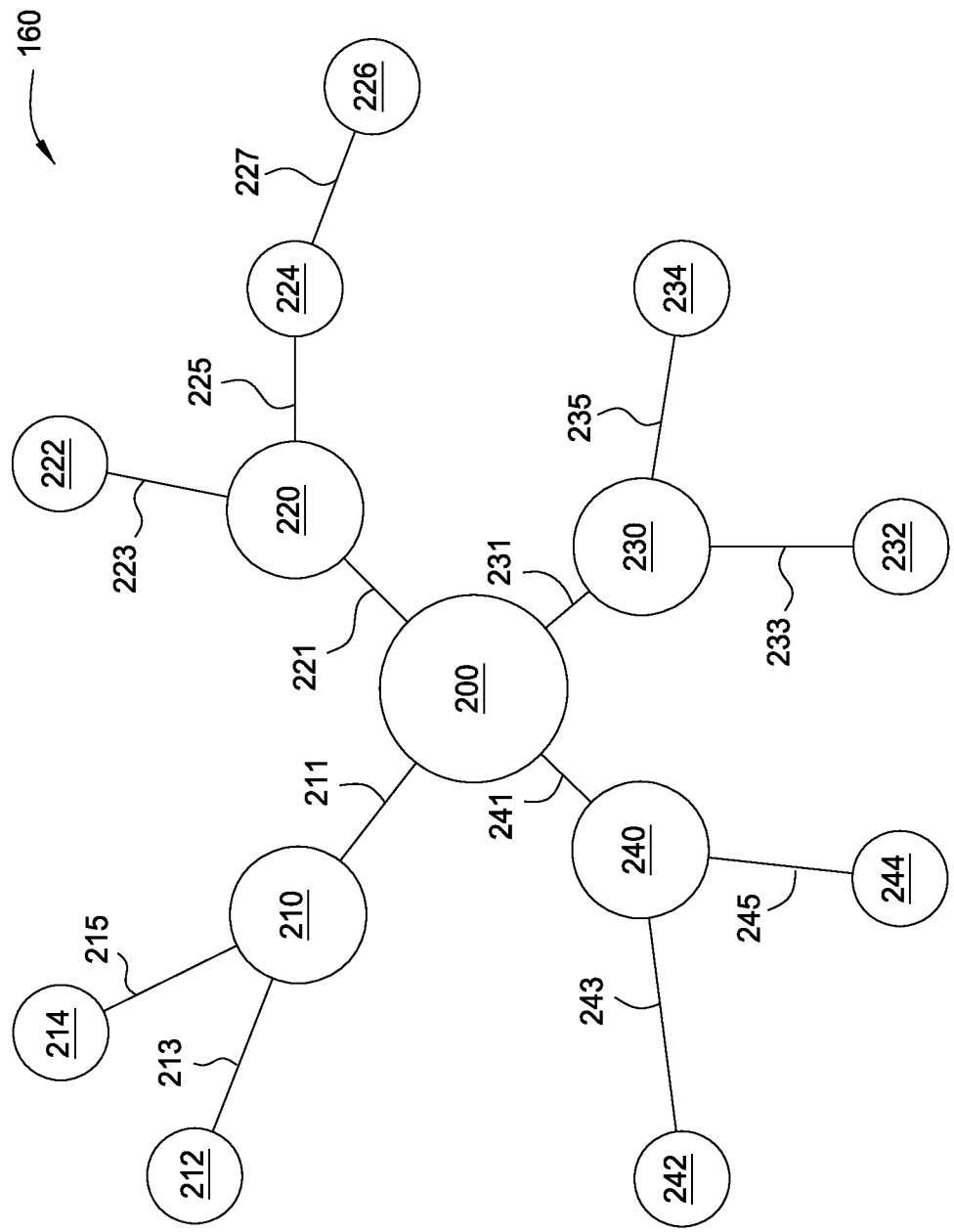
Figure 6C:
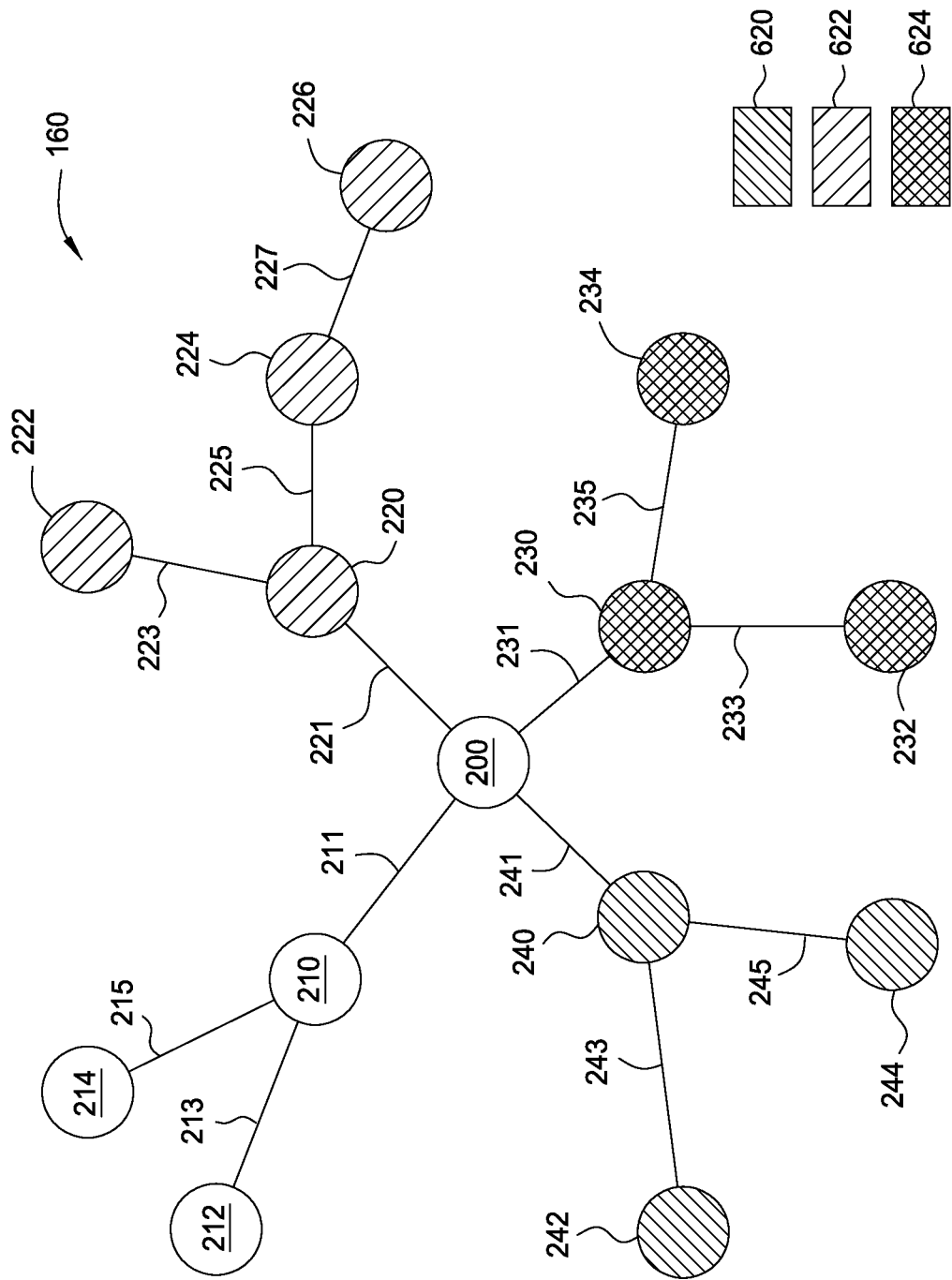

FIGS. 6A-6C illustrate different techniques for visualizing simulated network 160 of FIG. 5C, according to various embodiments of the present invention. As shown in FIG. 6A, simulated network 160 includes a variety of different types of links between nodes. A first type of link includes the various links previously shown in FIGS. 5a-5C. A second type of link includes links 602, 604, 606, and 608. A third type of link includes link 610. A fourth type of link includes links 612, 614, and 616. A fifth type of link includes link 618. The different types of links shown in FIG. 6A may be specified within link data 148. Visualization engine 132 may depict each different type of link with a different visual indication. In the example shown in FIG. 6A, different types of links are depicted by different line styles. However, visualization engine 132 may rely on any technically feasible approach for distinguishing types of links, including different colors, different line weights, etc.

The different types of links discussed herein generally correspond to different types of relationships between nodes. For example, in the context of a company organization represented by simulated network 160, the first type of link could represent a seniority relationship between employees, the second type of link could reflect previous seniority relationships between the linked nodes, the third type of link could indicate that the linked employees contribute to a particular project, the fourth type of link could signify that the linked employees all reside in a similar location, while the fifth type of link could denote that the linked employees subscribe to a particular email list.

In one embodiment, when visualization engine 132 applies the set of physical laws in the fashion described thus far, visualization engine 132 may compute different attractive forces for each different type of link. In other words, each type of link may contribute a different attractive force between linked nodes. Visualization engine 132 could weight each link type differently, among other possibilities. When adjusting the positions of each node based on the repulsive and attractive forces on those nodes, visualization engine 132 may accumulate the different attractive forces from each different type of link and factor and then adjust the position of each node based on the accumulated forces. In this fashion, simulated network 160 may represent a complex network capable of illustrating many different relationships between nodes.

In FIG. 6B, different nodes of simulated network 160 are depicted with different sizes. The different sizes shown may reflect a wide variety of different attributes associated with those different nodes. For example, the size of a given node could reflect a time when that node was added, the degree to which the position of that node has changed over time, the number of links associated with that node, the degree to which the number of links associated with the node has changed over time, and so forth. In the context of a company network, for example, node size could indicate seniority, and so the largest node 200 could represent the chief executive officer (CEO) of the company, the mid-sized nodes 210, 220, 230, and 240 could represent managers in the company, and the other smaller nodes could represent subordinates of those managers.

In FIG. 6C, different nodes of simulated network 160 are depicted with different patterns 620, 622, and 624. The different patterns may reflect a wide variety of different attributes associated with the different nodes, similar to the different sizes shown in FIG. 6B. For example, the pattern associated with a given node could indicate that the node is included within a specific subset of nodes, the node changed position at a certain time, links were added to or removed from the node recently, and so forth. In the context of a company network, for example, node pattern could indicate a specific group that certain employees belong to, a specific project that different employees are involved with, or a certain location where employees work. Persons skilled in the art will understand that the patterns shown in FIG. 6C may also be replaced with different colors.

Referring generally to FIGS. 6A-6C, the different visualization techniques described in conjunction with those Figures may be combined with one another in any technically feasible fashion. For example, visualization engine 132 could depict simulated network 160 with different types of links between various sized nodes that are depicted with different patterns and/or colors. By implementing these different visualization techniques, in conjunction with the techniques for updating the state of simulated network 160 discussed above in conjunction with FIGS. 4A-5C, visualization engine 132 is capable of displaying to an end-user the evolution of a network over time. The different techniques described above in conjunction with FIGS. 4A-6C are also described, in stepwise fashion, below in conjunction with FIG. 7.

Figure 7:
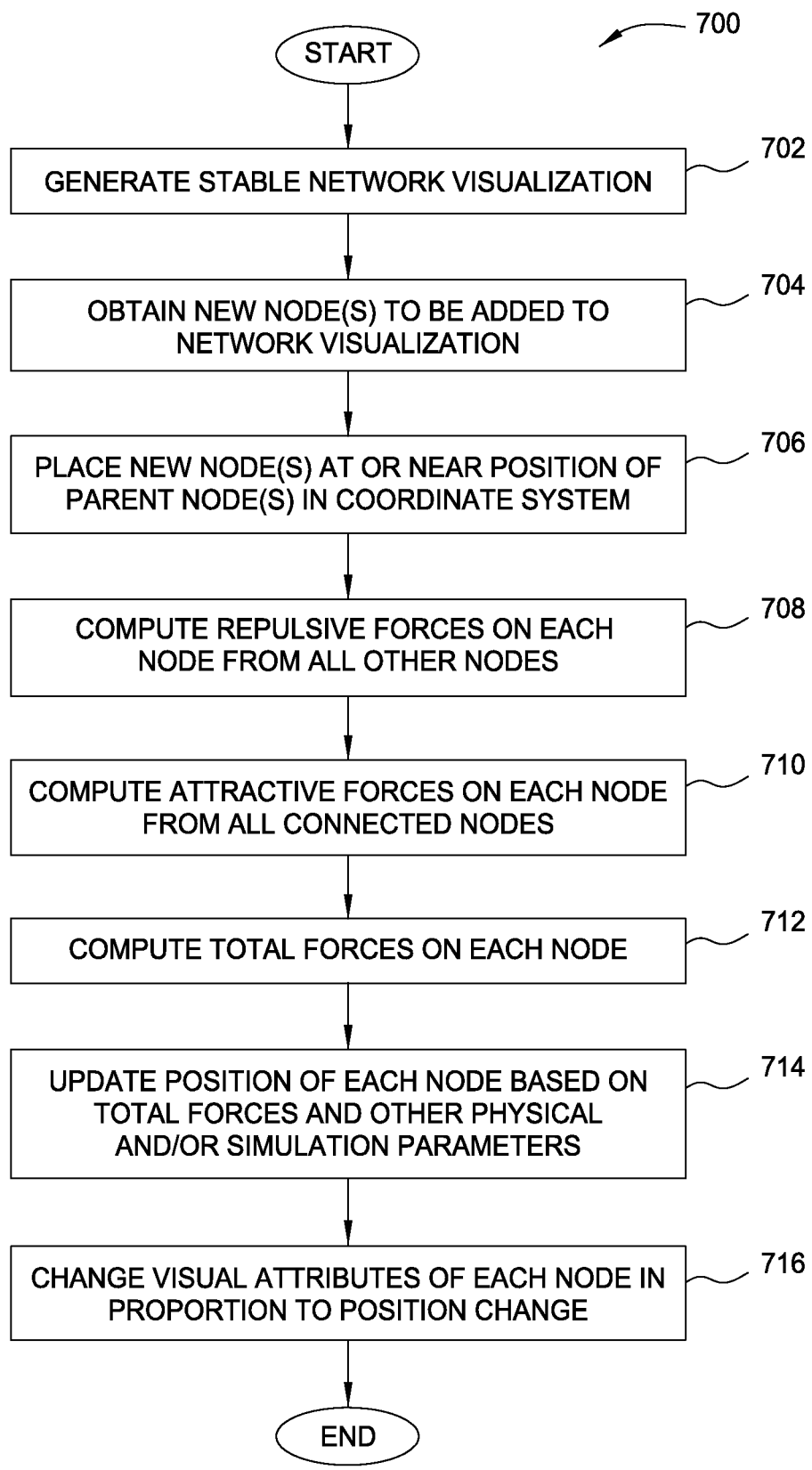
FIG. 7 is a flow diagram of method steps for adding nodes to a simulated network, according to one embodiment of the present invention.

FIG. 7 is a flow diagram of method steps for adding nodes to a simulated network, according to one embodiment of the present invention. Although the method steps are described in conjunction with the system of FIGS. 1-2C and 4A-6C, persons skilled in the art will understand that any system configured to perform the method steps, in any order, is within the scope of the present invention.

As shown, a method 700 begins at step 702, where visualization engine 132 generates a stable simulated network 160 and associated network visualization 136. Visualization engine 132 generates a stable simulated network 160 by performing the method 300 described above.

At step 704, visualization engine 132 obtains one or more new nodes to be added to simulated network 160. Visualization engine 132 may obtain the new nodes by parsing network data 144 and identifying that node data 146 includes additional nodes compared to previous node data.

At step 706, visualization engine 132 places the new node(s) at or near the position of one or more parent nodes within the multidimensional coordinate system where simulated network 160 resides. Visualization engine 132 may identify the parent nodes of the new nodes based on link data within network data 144.

At step 708, visualization engine 132 computes repulsive forces on each node from all other nodes within simulated network 160. As mentioned above, each node within simulated network 160 generates a force that repels all other nodes, where that force may be a function of distance between nodes. The repulsive forces within simulated network 160 change when new nodes are added at step 706.

At step 710, visualization engine 132 computes attractive forces on each node from all connected nodes. As mentioned above, each link within simulated network 160 generates a force that attracts the pair of nodes connected by that link to towards one another, where that force may be a function of distance between nodes. When new nodes are added at step 706, those nodes are linked to other preexisting nodes within simulated network 160, resulting in additional attractive forces.

At step 712, visualization engine 132 computes the total forces on each node within simulated network 160. In doing so, visualization engine 132 accumulates the repulsive forces exerted on each node, accumulates the attractive forces exerted on each node, and then sums these accumulated forces. When new nodes are added to simulated network 160, the balance of forces exerted on each node may change.

At step 714, visualization engine 132 updates the position of each node within simulated network 160 based on the total forces exerted on those nodes computed at step 712, as well as various other physical and/or simulation parameters. Physical parameters may include mass values associated with each node, among other possibilities, while simulation parameters may include a time step associated with the physical simulation or grid spacing values associated with the multidimensional coordinate system, among other possibilities.

At step 716, visualization engine 132 modifies one or more visual attributes associated with each node in proportion to any position adjustments applied to those nodes. For example, if visualization engine 132 changes the position of a certain node by a given distance at step 714, then at step 716, visualization engine 132 may change the color of that node and/or the size of the node by an amount that is proportional to the given distance. The method 700 then terminates.

Referring to both FIGS. 3 and 7, by implementing the methods 300 and 700 described in those Figures, respectively, in conjunction with one another, visualization engine 132 is configured to (i) generate a graphical depiction of a network and (ii) illustrate changes to that network over time.

In sum, a visualization engine is configured to generate a network visualization that represents the evolution of a network over time. The visualization engine generates the network visualization based on a network dataset that describes various nodes within the network, and links between those nodes, over a sequence of time intervals. Initially, the visualization engine generates a stable simulated network based on initial network data, and then subsequently animates changes to that simulated network that derive from differences between the initial network data and subsequent network data. The visualization engine visually indicates changes to different nodes in the network via color changes, size changes, and other changes to the appearance of nodes.

At least one advantage of the present invention is that the organizational structure of a complex network, and changes to that network, can be visualized over time. Further, adjusting the visual properties of the changed nodes and/or links emphasizes the changes to that network. Accordingly, an end-user may grasp the evolution of that network more easily.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for visualizing a network described by a sequence of network data, the method comprising:
generating a simulated network based on first network data included in the sequence of network data, wherein the first network data identifies a first set of nodes and a first set of links associated with the first set of nodes, wherein the first set of nodes comprises at least one existing node;
rendering, via a visualization application, a first image that illustrates the first set of nodes and the first set of links;
modifying the simulated network based on second network data in the sequence of network data, wherein the second network data identifies a second set of nodes and a second set of links associated with the second set of nodes, wherein the second set of nodes comprises the at least one existing node and at least one new node not included in the first set of nodes;
rendering, via the visualization application, a second image that illustrates the second set of nodes and the second set of links, wherein the second image illustrates the at least one new node and the at least one existing node, wherein the at least one existing node has a first size based on when the at least one existing node is added to the simulated network and the at least one new node has a second size based on when the at least one new node is added to the simulated network, and wherein the second size is different than the first size; and
generating, via the visualization application, a visualization of the network for display, wherein the visualization includes an animation comprising a combined sequence of frames based on the first image and the second image to illustrate the evolution of the network over time.

2. The computer-implemented method of claim 1, wherein generating the simulated network comprises:
inserting each node in the first set of nodes into a simulated multidimensional space;
coupling one or more nodes included in the first set of nodes, via one or more links included in the first set of links, to one or more corresponding nodes included in the first set of nodes;
computing a total simulated force exerted on a first node included in the first set of nodes by other nodes in the first set of nodes; and
updating the position of the first node within the simulated multidimensional space based on the total simulated force exerted on the first node, wherein the total simulated force is based, in part, on an assigned repulsive force associated with each node, and an assigned attractive force associated with each link, wherein the repulsive forces and attractive forces exerted between a pair of nodes is a function of a distance between the pair of nodes.

3. The computer-implemented method of claim 2, wherein computing the total simulated force exerted on the first node comprises:
computing a cumulative repulsive force exerted on the first node by one or more other nodes included in the first set of nodes;
computing a cumulative attractive force exerted on the first node by at least one node included in the first set of nodes and coupled to the first node via a first link included in the first set of links; and
summing the cumulative repulsive force and the cumulative attractive force.

4. The computer-implemented method of claim 2, wherein updating the position of the first node comprises evaluating a set of physical laws of motion based on the total simulated force exerted on the first node.

5. The computer-implemented method of claim 2, further comprising iteratively updating the position of the first node until the total simulated force exerted on the first node falls below a threshold value.

6. The computer-implemented method of claim 1, wherein modifying the simulated network comprises adding, based on the second network data, at least one node and at least one link coupled to the at least one node to the simulated network, or removing, based on the second network data, at least one node and at least one link coupled to the at least one node from the simulated network.

7. The computer-implemented method of claim 6, further comprising:
computing a total simulated force exerted on a second node included in the first set of nodes in response to adding the at least one node and the at least one link to the simulated network, or removing the at least one node and the at least one link from the simulated network; and
updating the position of the second node based on the total simulated force exerted on the second node.

8. The computer-implemented method of claim 7, wherein adjusting the position of the second node comprises evaluating a set of physical laws of motion based on the total simulated force exerted on the second node.

9. The computer-implemented method of claim 6, wherein the second image reflects a degree to which a first region of the simulated network changes in response to adding the at least one node or removing the at least one node.

10. The computer-implemented method of claim 1, wherein:
adding the at least one new node in the second image causes a position change of the at least one existing node from a first position in the first image to a second position in the second image.

11. The computer-implemented method of claim 10, wherein:
the first image illustrates the at least one existing node at a first position with a first appearance,
the second image illustrates the at least one existing node at a second position with a second appearance that is different than the first appearance,
a degree of change between the first appearance and the second appearance of the at least one existing node is based on an amount of the position change of the at least one existing node, and
the degree of change between the first appearance and the second appearance of the at least one existing node is proportional to a distance of the position change of the at least one existing node.

12. A non-transitory computer-readable medium storing program instructions that, when executed by a processing unit, cause the processing unit to visualize a network described by a sequence of network data, by performing the steps of:

generating a simulated network based on first network data included in the sequence of network data, wherein the first network data identifies a first set of nodes and a first set of links associated with the first set of nodes, wherein the first set of nodes comprises at least one existing node;

rendering, via a visualization application, a first image that illustrates the first set of nodes and the first set of links;

modifying the simulated network based on second network data in the sequence of network data, wherein the second network data identifies a second set of nodes and a second set of links associated with the second set of nodes, wherein the second set of nodes comprises the at least one existing node and at least one new node not included in the first set of nodes;

rendering, via the visualization application, a second image that illustrates the second set of nodes and the second set of links, wherein the second image illustrates the at least one new node and the at least one existing node, wherein the at least one existing node has a first size based on when the at least one existing node is added to the simulated network and the at least one new node has a second size based on when the at least one new node is added to the simulated network, and wherein the second size is different than the first size; and generating, via the visualization application, a visualization of the network for display, wherein the visualization includes an animation comprising a combined sequence of frames based on the first image and the second image to illustrate the evolution of the network over time.

13. The non-transitory computer-readable medium of claim 12, wherein the step of generating the simulated network comprises:

inserting each node in the first set of nodes into a simulated multidimensional space;

coupling one or more nodes included in the first set of nodes, via one or more links included in the first set of links, to one or more corresponding nodes included in the first set of nodes;

computing a total simulated force exerted on a first node included in the first set of nodes by other nodes in the first set of nodes; and updating the position of the first node within the simulated multidimensional space based on the total simulated force exerted on the first node, wherein the total simulated force is based, in part, on an assigned repulsive force associated with each node, and an assigned attractive force associated with each link, wherein the repulsive forces and attractive forces exerted between a pair of nodes is a function of a distance between the pair of nodes.

14. The non-transitory computer-readable medium of claim 13, wherein computing the total simulated force exerted on the first node comprises:

computing a cumulative repulsive force exerted on the first node by one or more other nodes included in the first set of nodes;

computing a cumulative attractive force exerted on the first node by at least one node included in the first set of nodes and coupled to the first node via a first link included in the first set of links; and summing the cumulative repulsive force and the cumulative attractive force.

15. The non-transitory computer-readable medium of claim 13, wherein updating the position of the first node comprises evaluating a set of physical laws of motion based on the total simulated force exerted on the first node.

16. The non-transitory computer-readable medium of claim 13, further comprising iteratively updating the position of the first node until the total simulated force exerted on the first node falls below a threshold value.

17. The non-transitory computer-readable medium of claim 12, wherein the step of modifying the simulated network comprises adding, based on the second network data, at least one node and at least one link coupled to the at least one node to the simulated network, or removing, based on the second network data, at least one node and at least one link coupled to the at least one node from the simulated network.

18. The non-transitory computer-readable medium of claim 17, further comprising:

computing a total simulated force exerted on a second node included in the first set of nodes in response to adding the at least one node and the at least one link to the simulated network, or removing the at least one node and the at least one link from the simulated network; and updating the position of the second node based on the total simulated force exerted on the second node.

19. The non-transitory computer-readable medium of claim 18, wherein adjusting the position of the second node comprises evaluating a set of physical laws of motion based on the total simulated force exerted on the second node.

20. The non-transitory computer-readable medium of claim 17, wherein the second image reflects a degree to which a first region of the simulated network changes in response to adding the at least one node or removing the at least one node.

21. A system configured to visualize a network described by a sequence of network data, comprising:

a display device;

a memory unit that includes a visualization application;

a processing unit coupled to the memory unit, wherein, upon executing the visualization application, is configured to:

generate a simulated network based on first network data included in the sequence of network data, wherein the first network data identifies a first set of nodes and a first set of links associated with the first set of nodes, wherein the first set of nodes comprises at least one existing node, render a first image that illustrates the first set of nodes and the first set of links, modify the simulated network based on second network data in the sequence of network data, wherein the second network data identifies a second set of nodes and a second set of links associated with the second set of nodes, wherein the second set of nodes comprises the at least one existing node and at least one new node not included in the first set of nodes, render a second image that illustrates the second set of nodes and the second set of links, wherein the second image illustrates the at least one new node and the at least one existing node, wherein the at least one existing node has a first size based on when the at least one existing node is added to the simulated network and the at least one new node has a second size based on when the at least one new node is added to the simulated network, and wherein the second size is different than the first size, and generate a visualization of the network for display, wherein the visualization includes an animation comprising a combined sequence of frames based on the first image and the second image to illustrate the evolution of the network over time.

22. The system of claim 21, wherein the memory unit stores program instructions that, when executed by the processing unit, cause the processing unit to:

generate the simulated network;
render the first image;
modify the simulated network;
render the second image; and
generate the visualization of the network for display on the display device.

* * * * *

UNITED STATES PATENT AND TRADEMARK OFFICE
CERTIFICATE OF CORRECTION

PATENT NO. : 10,761,956 B2
APPLICATION NO. : 14/542390
DATED : September 1, 2020
INVENTOR(S) : Justin Frank Matejka and George Fitzmaurice It is certified that error appears in the above-identified patent and that said Letters Patent is hereby corrected as shown below:

On the Title Page

Page 2, Column 1, (56) References Cited Line 56:
Please delete "Gao, et al., "FacetAtlas: Multifaceted Visualization for Rich Text Corpora", IEEE Transactions on Visualization and Computer Graphics, 16(6), 2010, pp. 1172-1181." and insert --Cao, et al., "FacetAtlas: Multifaceted Visualization for Rich Text Corpora", IEEE Transactions on Visualization and Computer Graphics, 16(6), 2010, pp. 1172-1181.--.

Signed and Sealed this
Seventeenth Day of November, 2020

Andrei Iancu
*Director of the United States Patent and Trademark Office*